US006999987B1

(12) United States Patent
Billingsley et al.

(10) Patent No.: US 6,999,987 B1
(45) Date of Patent: Feb. 14, 2006

(54) SCREENING AND SURVEY SELECTION SYSTEM AND METHOD OF OPERATING THE SAME

(75) Inventors: Michael David Billingsley, Farmers Branch, TX (US); Gary Crance, Plano, TX (US); Michael J. Cunningham, Lewisville, TX (US); Anderson Greene, Lewisville, TX (US); Charles A. Miller, Coppell, TX (US); Edwin Franklin Shaw, Irving, TX (US)

(73) Assignee: America Online, Inc., Dulles, VA (US)

( * ) Notice: Subject to any disclaimer, the term of this patent is extended or adjusted under 35 U.S.C. 154(b) by 697 days.

(21) Appl. No.: 09/695,955

(22) Filed: Oct. 25, 2000

(51) Int. Cl.
*G06F 15/16* (2006.01)

(52) U.S. Cl. .................. 709/203; 709/217; 709/219; 709/223; 705/1; 705/7; 705/10; 707/10

(58) Field of Classification Search ............. 709/203, 709/217, 219, 223–25, 224–225, 227–229; 705/1, 7, 10, 14; 707/3, 5, 10
See application file for complete search history.

(56) References Cited

U.S. PATENT DOCUMENTS

| | | | | |
|---|---|---|---|---|
| 5,740,035 A | * | 4/1998 | Cohen et al. | 705/10 |
| 5,774,670 A | * | 6/1998 | Montulli | 709/227 |
| 5,796,393 A | * | 8/1998 | MacNaughton et al. | 345/733 |
| 5,870,552 A | * | 2/1999 | Dozier et al. | 709/219 |
| 5,893,098 A | * | 4/1999 | Peters et al. | 707/10 |
| 6,032,177 A | * | 2/2000 | O'Donnell | 709/204 |
| 6,070,145 A | * | 5/2000 | Pinsley et al. | 705/10 |
| 6,189,029 B1 | * | 2/2001 | Fuerst | 709/217 |
| 6,236,975 B1 | * | 5/2001 | Boe et al. | 705/7 |
| 6,477,504 B1 | * | 11/2002 | Hamlin et al. | 705/10 |
| 6,513,014 B1 | * | 1/2003 | Walker et al. | 705/10 |
| 6,616,458 B1 | * | 9/2003 | Walker et al. | 434/322 |
| 6,618,746 B2 | * | 9/2003 | Desai et al. | 709/204 |
| 6,631,370 B1 | * | 10/2003 | Pekkanen | 707/4 |
| 2002/0002482 A1 | * | 1/2002 | Thomas | 705/10 |
| 2002/0052774 A1 | * | 5/2002 | Parker et al. | 705/10 |
| 2002/0128898 A1 | * | 9/2002 | Smith et al. | 705/10 |

* cited by examiner

*Primary Examiner*—Ario Etienne
*Assistant Examiner*—LaShonda Jacobs
(74) *Attorney, Agent, or Firm*—Fish & Richardson P.C.

(57) ABSTRACT

A screening and survey selection system, method of screening and selecting for a survey and a computer system employing the system and method. In one embodiment, the screening and survey selection system includes a survey queue having a plurality of queue slots, each of the plurality of queue slots including a survey available for a respondent. The screening and survey selection system also includes a random number generator that generates a number pertaining to a selected one of the plurality of queue slots as a function of at least one characteristic associated with the respondent. The screening and survey selection system still further includes a screener block question generator that develops a plurality of screener block questions that determine if the respondent is qualified to participate in a survey corresponding to the selected one of the plurality of queue slots.

38 Claims, 12 Drawing Sheets

WHICH OF THE FOLLOWING FOODS HAVE YOU BOUGHT FOR YOUR BOY AGE 10-12 IN THE PAST 30 DAYS? (SELECT ALL THAT APPLY)

- ☑ BAKED GOODS (COOKIES, CUPCAKES, ETC.)
- ☑ CANDY
- ☐ GRANOLA BARS AND CEREAL BARS
- ☑ FROZEN NOVELTIES (ICE CREAM SANDWICHES, ICE POPS, ETC.)
- ☐ SALTY SNACKS (POTATO CHIPS AND PRETZELS)
- ☐ NONE OF THE ABOVE

[<<PREVIOUS QUESTION]  [NEXT QUESTION>>]

THERE ARE SEVERAL AREAS AVAILABLE TO KIDS ONLINE. CHECK THE BOX NEXT TO EACH AREA THAT YOU KNOW YOUR BOY AGE 10-12 HAS BEEN TO IN THE LAST 30 DAYS. (SELECT ALL THAT APPLY)

- ☑ AOL KIDS ONLY
- ☑ CARTOON NETWORK WORLD
- ☐ DISNEY
- ☑ FOX KIDS
- ☐ GAMEPRO ONLINE
- ☐ HIGHLIGHTS FOR CHILDREN
- ☑ KIDS WB
- ☐ KIDSCOM
- ☐ NICKELODEON
- ☐ SPORTS ILLUSTRATED FOR KIDS
- ☐ NONE OF THE ABOVE

[<<PREVIOUS QUESTION] [NEXT QUESTION>>]

SCREENING AND SURVEY SELECTION SYSTEM AND METHOD OF OPERATING THE SAME

TECHNICAL FIELD OF THE INVENTION

The present invention is directed, in general, to computer systems and, more specifically, to a screening and survey selection system and method of operating the same.

BACKGROUND OF THE INVENTION

The distribution and processing of information have been revolutionized by the use of computers connected to a network. At first, the networks were small and contained within a local area. These small networks were called local area networks ("LANs") LANs allowed small numbers of users to efficiently distribute information and files among each of the computers connected to the LAN. Soon thereafter, several LANs were connected together forming a wide area network ("WAN"). WANs allowed users to exchange information across networks located in different geographic areas. Currently, one of the largest computer networks is the Internet.

The Internet is a worldwide interconnection of computer networks that communicate using a common protocol and allows millions of computers from low-end personal computers to high-end super computers to communicate with each other. The Internet was conceived by the Advanced Research Projects Agency ("ARPA") of the U.S. government in the 1960s and was first known as the "ARPANet." The original aim of ARPA was to create a network that would allow users of a research computer at one university to be able to "talk to" research computers located at other universities. A side benefit of ARPANet's design was that, because messages could be routed or rerouted in more than one direction throughout the network, the network could continue to function even if parts of the network were destroyed in the event of a military attack or other disaster.

As the usage of the Internet expanded outside of the academic/research community and into the corporate community, the Internet became a public, cooperative, and self-sustaining facility accessible to hundreds of millions of people worldwide. Physically, the Internet uses a portion of the total resource of the currently existing public telecommunication networks. Technically, what distinguishes the Internet is its use of a set of protocols called Transmission Control Protocol/Internet Protocol ("TCP/IP"). Two recent adaptations of Internet technology, "intranets" and "extranets," also make use of the TCP/IP protocol.

For many Internet users, electronic mail ("e-mail") has practically replaced the United States Postal Service for short written transactions and is the most widely used application on the Internet. The Internet can distribute electronic embodiments of textbooks, magazines, advertisements and audio and video clips around the world. Using the Internet's Internet Relay Chat ("IRC"), a person on one computer system can have live "conversations" with other computer users connected to the Internet. More recently, Internet telephony hardware and software allow real-time voice conversations (also called "voice over IP").

One of the most rapidly expanding aspects of the Internet is the World Wide Web (the "Web"). The Web consists of computers (servers and clients) that are able to support a common Hypertext Transfer Protocol ("HTTP"). HTTP is the set of rules for exchanging files, such as text, graphic images, sound, video and other multimedia files on the Web. Relative to the TCP/IP suite of protocols (which are the basis for information exchange on the Internet), HTTP is an application protocol.

The Web also allows documents and graphical material to be interlinked by means of "hypertext" elements or tags. In most Web sites, hypertext words or phrases appear in text of a different color than the rest of the text and are often underlined. Hypertext elements can also be buttons, graphical images, or portions of the graphical images and causes the pointer on the screen to change into a hand when the pointer is over the hypertext element. When a user selects a hypertext word, phrase or graphical image, a related document, identified by the hypertext link, will automatically be retrieved and processed. Commonly, hypertext elements are used to change pages on a Web site or to change Web sites.

Typically, most Web sites are accessed using a Web browser such as Netscape's Navigator™. The appearance of a particular Web site may vary slightly depending on the Web browser used. Also, Web browsers have the ability for animation, virtual reality and sound.

The Web is also very useful for allowing users to conduct business no matter where the user is located. The business Web sites allow users to subscribe to services, purchase items and retrieve information. One such business that can be facilitated via a computer system such as the Web is related to the sales and marketing field and, in particular, the collection of market data.

In the past, various systems and methods have been used to collect market survey data. One method is the mall intercept, wherein a number of interviewers are placed in various locations in a shopping mall and are tasked with intercepting potential respondents. Each respondent may, in a preliminary screening, be asked a series of basic screening questions to determine whether the respondent qualifies for the particular survey that the interviewer is attempting to complete. If a respondent does not qualify for the survey, the respondent is dismissed and the interviewer seeks out a new respondent. If the respondent does qualify, the interviewer may then proceed to ask the respondent the survey questions or have the respondent take the survey.

The mall intercept method has a number of deficiencies. It may be extremely difficult, if not impossible, for the interviewer to screen respondents for possible qualification in multiple surveys. The interviewer is thus generally limited to screening for one survey at a time.

Further, the screening may be dependent, to a large extent, on an individual interviewer and, as a result, may be subject to the individual interviewer's subjective biases. Take, for example, a survey that requires respondents to be of a certain age group. The interviewer may make incorrect assumptions about the age of certain potential respondents and, therefore, may not ask the respondent to participate in the preliminary screening. By prematurely eliminating potential respondents, the interviewer may bias the survey, since only respondents whose physical appearance, in the interviewer's opinion, places them in the age group will even be approached by the interviewer.

Another method of collecting market surveying data is the telephone method. An interviewer may manually dial a potential respondent on the telephone or the telephone may be automatically dialed by an automated telephone system. Similar to the mall intercept method, the interviewer then performs a preliminary screening, asking the respondent a series of basic screening questions to determine whether the respondent qualifies for the particular survey that the interviewer is attempting to complete. If a respondent does not qualify for the survey, the respondent is dismissed and the interviewer seeks out a new respondent. If the respondent does qualify, the interviewer may then proceed to ask the respondent the survey questions.

The telephone method may reduce the effects of interviewer bias, since the interviewer will typically not be able to make a judgment as to the respondent's qualifications based on physical appearance. The telephone method, however, still suffers from some of the same deficiencies as the mall intercept method, namely, that it may be impractical to screen the same respondent for possible participation in multiple surveys.

Panel-based methods are yet another way to collect market survey data. Researchers may employ e-mail to recruit a panel. The e-mail addresses may be obtained from a list provided by a client or, for example, from a database containing e-mail addresses and basic demographic data pertaining to the e-mail addresses. In a typical e-mail-based panel screening and survey selection system, a list of potential respondents may be developed based on the demographic requirements of a particular survey. The respondents are then sent invitations via e-mail to participate in the survey. Since the e-mail addresses are generally generated in response to the demographic requirements of a particular survey, the respondents are necessarily limited to participation in that particular survey.

E-mail-based panels also suffer from a number of deficiencies. For example, a respondent may have been interested in participating in surveys at the time the database was compiled, but is no longer interested in participating by the time the e-mail notice is sent. The system may attempt to compensate by sending invitations to a greater number of respondents than required by the survey. However, this leads to the possibility that more respondents will participate than is actually required. Another problem that exists with e-mail-based systems is that a single respondent may have multiple e-mail addresses and may therefore participate in the same survey multiple times.

Accordingly, what is needed in the art is a computer network based screening and survey selection system that overcomes the deficiencies of the prior art.

SUMMARY OF THE INVENTION

To address the above-discussed deficiencies of the prior art, the present invention provides a screening and survey selection system, method of screening and selecting for a survey and a computer system employing the system and method. In one embodiment, the screening and survey selection system includes a survey queue having a plurality of queue slots, each of the plurality of queue slots including a survey available for a respondent. The screening and survey selection system also includes a random number generator that generates a number pertaining to a selected one of the plurality of queue slots as a function of at least one characteristic associated with the respondent. The screening and survey selection system still further includes a screener block question generator that develops a plurality of screener block questions that determine if the respondent is qualified to participate in a survey corresponding to the selected one of the plurality of queue slots.

The present invention introduces, in one aspect, a system that systematically, yet randomly, qualifies respondents to participate in surveys. At an intermediate level, the random number generator employs a weighted statistical analysis tool to qualify the respondents for surveys based on at least one characteristic associated with the respondent. The screener block question generator then finally qualifies the respondent for the surveys based on responses to the screener block questions. Thus, by the time a respondent ultimately participates in a survey, it is readily apparent whether or not the respondent is especially qualified from all perspectives, including demographics. Consequently, the screening and survey selection system attains highly accurate results, in an expedient manner.

In one embodiment of the present invention, the screening and survey selection system further includes an access and control subsystem that determines access rights of the respondent. In a related embodiment, the screening and survey selection system further includes a control database that contains attributes associated with the respondent. In yet another related embodiment, the attributes are selected from the group consisting of a screenname of the respondent, a login identification of the respondent, category codes for past surveys and completion dates of the past surveys taken by the respondent, and a last entry date to the screening and survey selection system by the respondent. Of course, any attributes that provide initial screening information about the respondent are well within the broad scope of the present invention. The access and control subsystem in conjunction with the control database, therefore, further augments the efficiency of the screening and survey selection system by pre-qualifying respondents accessing the system.

In one embodiment of the present invention, the screening and survey selection system further includes a master screener that develops questions (dynamic screener questions) that determine the characteristics. In a related embodiment, the characteristics are selected from the group consisting of a zip code of residence of the respondent, an age of the respondent, a gender and ethnic background of said respondent, occupational information and composition of a household of said respondent, and decision making criteria of said household of said respondent. Of course, any characteristics that provide information to assist the random number generator to serve its intended purpose are well within the broad scope of the present invention.

In one embodiment of the present invention, the screening and survey selection system further includes a quota subsystem that determines an availability of the survey corresponding to the selected one of the plurality of queue slots. In a related embodiment, the screening and survey selection system further includes a survey quota file that contains status information regarding surveys located in the survey queue. Thus, the quota subsystem in association with the survey quota file determines an availability of a survey. For instance, if more than enough data has been acquired with respect to a particular survey, then the quota subsystem will not allow a respondent access to the survey, no matter how extraordinary the qualifications of the respondent.

In one embodiment of the present invention, the screening and survey selection system further includes a survey engine that monitors a number of respondents accessing the screening and survey selection system. The survey engine also monitors other factors associated with the screening and survey selection system. For instance, the survey engine monitors the flow of traffic in the screening and survey selection system at specified time intervals and, in the spirit of expediency, requests that the respondent return to the system at a later time if the traffic is too heavy. Thus, the survey experience for the respondent is heightened by the survey engine.

In one embodiment of the present invention, the screening and survey selection system further includes a crediting file that contains benefit information associated with the respondent. For instance, the respondent may receive rewards points (or airline miles) that may be used for promotional efforts such as travel vouchers or online time on the Internet with America Online. Of course, any crediting system that provides a bona fide benefit to the respondent for participating in a survey is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 6A–6G illustrate diagrams demonstrating selected screens associated with the screening and survey selection system of FIG. 5.

DETAILED DESCRIPTION

Figure 1:
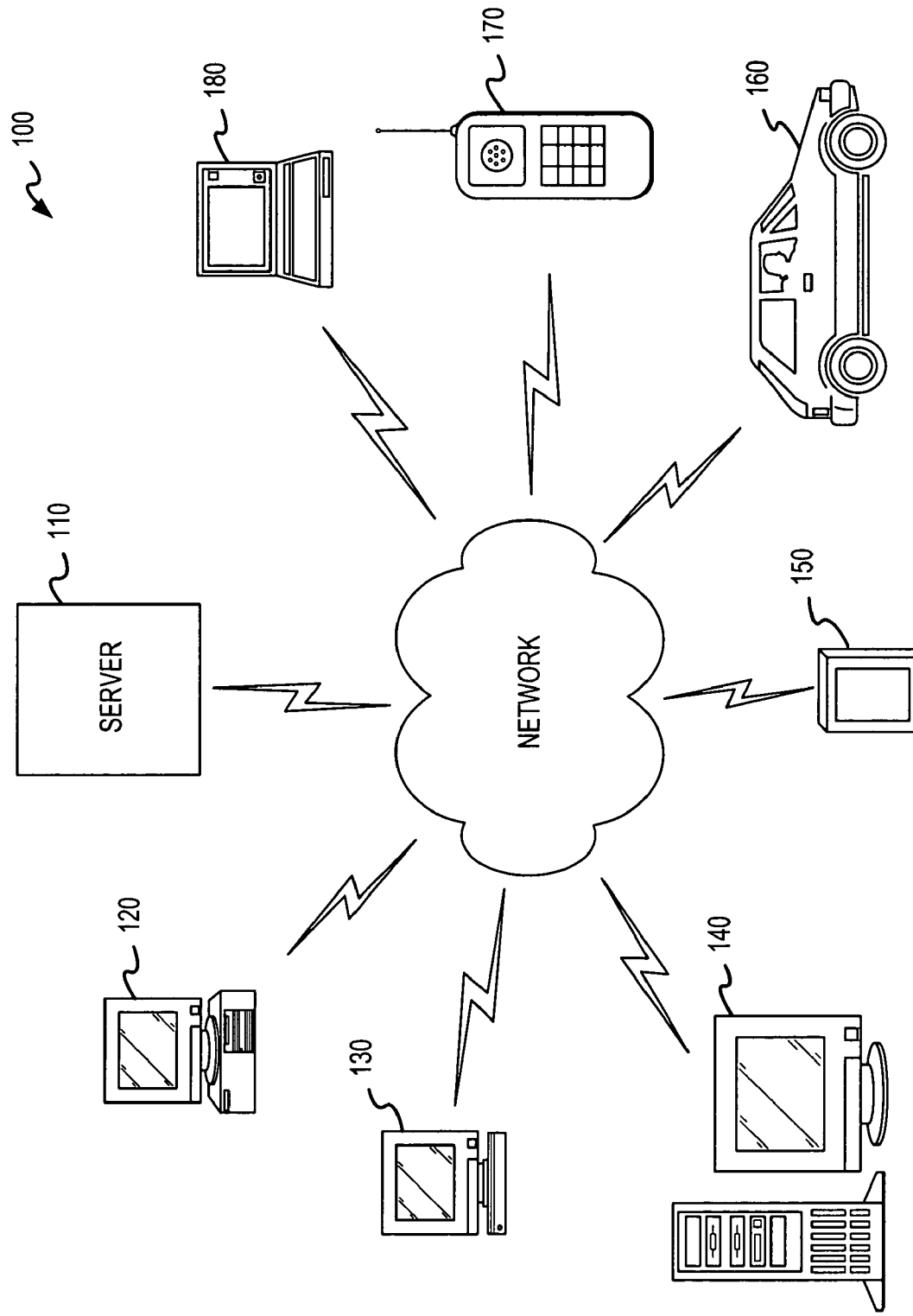
FIG. 1 illustrates a block diagram of an embodiment of a computer network providing an environment for a screening and survey selection system constructed according to the principles of the present invention.

Referring initially to FIG. 1, illustrated is a block diagram of an embodiment of a computer network, generally designated 100, providing an environment for a screening and survey selection system constructed according to the principles of the present invention. The computer network 100 is configured to distribute, collect and process information and may include a LAN, a WAN, an intranet, an extranet, the Internet, the World Wide Web or a combination thereof. For purposes of the present invention, the World Wide Web is defined as all the resources and users on the Internet that are using HTTP. In one embodiment of the present invention, the computer network 100 communicates to each device connected thereto using TCP/IP.

TCP/IP is a two-layered protocol. The higher layer, TCP, manages the assembling of a message or file into smaller packets that are transmitted over the computer network 100 and received by a TCP layer that reassembles the packets into the original message. The lower layer, IP, handles the address part of each packet so that it gets to the right destination. Each gateway computer on the computer network 100 checks the address to determine where to forward the message. Even though some packets from the same message are routed differently than others, the packets will be reassembled at the destination.

TCP/IP uses the client/server model of communication in which a computer user (a client) requests and is provided a service (such as sending a Web page) by another computer (a server) in the computer network 100. TCP/IP communication is primarily point-to-point, meaning each communication is from one point (or host computer) in the computer network 100 to another point or host computer. TCP/IP and the higher-level applications that employ TCP/IP are collectively said to be "stateless" because each client request is considered a new request unrelated to any previous one (unlike ordinary phone conversations that require a dedicated connection for the call duration). Being stateless frees the network paths so that everyone can use the paths continuously. It should be understood that the TCP layer itself is not considered stateless as far as any one message is concerned; the connection remains in place until all packets in a message have been received.

Internet users are familiar with the even higher layer application protocols that use TCP/IP to get to the Internet. The higher level application protocols include the World Wide Web's HTTP, the File Transfer Protocol ("FTP"), Telnet (a command and protocol that allows users to logon to remote computers), and the Simple Mail Transfer Protocol ("SMTP"). These and other protocols are often packaged together with TCP/IP.

Personal computer users usually access the Internet through the Serial Line Internet Protocol ("SLIP") or the Point-to-Point Protocol ("PPP"). These protocols encapsulate the IP packets such that the packets can be sent over a dial-up phone connection to an access provider's connection device such as a conventional modem.

Protocols related to TCP/IP include the User Datagram Protocol ("UDP"), the Internet Control Message Protocol ("ICMP"), the Interior Gateway Protocol ("IGP"), the Exterior Gateway Protocol ("EGP") and the Border Gateway Protocol ("BGP"). Depending on the circumstance, the UDP may be used instead of TCP for special network communication purposes. The aforementioned protocols, namely, ICMP, IGP, EGP and BGP, are often used by network host computers for exchanging router information.

Besides the Internet, TCP/IP may also be employed as the communication protocol in the private networks called "intranets" and "extranets." An intranet is a private network that is contained within an enterprise (such as a company's office building). The intranet may consist of many interlinked LANs and use leased lines in a WAN. Typically, an intranet includes connections through one or more gateway computers (not shown) to the outside Internet. The main purpose of an intranet is to share company information and computing resources among employees. An intranet can also be used to facilitate working in groups and for teleconferences.

An intranet typically uses TCP/IP, HTTP and other Internet protocols and in general looks like a private version of the Internet. With tunneling, companies can send private messages through the public network, using the public network with special encryption/decryption and other security safeguards to connect one part of the intranet to another.

An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company. Just like the Internet, an extranet also uses HTML, HTTP, SMTP and other Internet protocols.

An extranet also requires security and privacy provided by the use of firewalls. Firewalls are typically servers that have the ability to screen messages in both directions so that company security is maintained. Firewall servers use digital certificates or similar means of user authentication, encryption of messages, and the use of virtual private networks ("VPNs") that tunnel through the public network.

A company can use an extranet to exchange large volumes of data using Electronic Data Interchange ("EDI") and share product catalogs exclusively with wholesalers or those "in the trade." The extranet can also be employed to allow a company to collaborate with other companies on joint development efforts and jointly develop and use training programs with other companies. Via the extranet, a company can also provide or access services provided by one company to a group of other companies, such as an online banking application managed by one company on behalf of affiliated banks, and share news of common interest exclusively with partner companies.

Within the environment of the computer network 100 is a server 110 that includes systems that allow the server to receive requests, perform specific tasks, retrieve and update information in at least one database and respond to requests sent over the computer network 100 to the server 110. In other embodiments, the computer network 100 may include multiple servers, each performing specific tasks, performing the same tasks, acting as redundant systems or acting as database sites. For instance, the server 110 can embody and generate the screening and survey selection system in accordance with the principles of the present invention.

In another embodiment of the present invention, the server 110 may be an application server. An application server is a computer in a distributed network containing specialized programs that provide the business logic for at least one application program located somewhere within the computer network 100. The application server is frequently viewed as part of a three-tier application, consisting of a graphical user interface ("GUI") server, an application (business logic) server, and a database and a transaction server. The first-tier of the application, also called "front-end," is usually located in a client computer such as a personal computer ("PC") or a workstation and may include a Web browser-based graphical user interface. The second-tier is the business logic application or set of applications and can be located on a LAN or an intranet server.

The third-tier of the application, also called "back-end," is the database and transaction server and may be located on a mainframe or a large server. Older, legacy databases and transaction management applications are part of the back-end or third-tier. The application server is the middleman between the browser-based front-ends and the back-end databases and legacy systems.

In many instances, the application server is combined with or works with a Web server and is called a "Web application server." The Web browser supports an easy-to-create HTML-based front-end for the user. The Web server provides several different ways to forward a request to an application server and to send a modified or new Web page to the user. These approaches include the Common Gateway Interface ("CGI"), FastCGI and the Java Server Page ("JSP"). In some cases, the Web application servers also support request "brokering" interfaces such as CORBA's Internet Inter-ORB Protocol ("IIOP").

The computer network 100 also includes a conventional PC 120, a conventional workstation 130, a conventional office computer system 140 and a conventional laptop computer 180. In other embodiments, the computer network 100 may include any number of PCs 120, workstations 130, office computer systems 140 and laptop computers 180. In one embodiment of the present invention, the PC 120, the workstation 130, the office computer system 140 and the laptop computer 180 are client computer systems. A client computer system includes a user interface that allows the user to access information, issue requests and perform functions related to the server 110. In another embodiment, the office computer system 140 may be configured as a second-tier type computer system.

In the illustrated embodiment, the computer network 100 also includes a personal digital assistant ("PDA") 150. A PDA is a term used for any small mobile hand-held device that provides, in part, computing, information storage and retrieval capabilities for personal or business use. PDAs are often used for keeping schedules, calendars and address book information (examples of PDAs include Hewlett-Packard's Palmtop™ and 3Com's PalmPilot™).

Most PDAs have a small keyboard and some PDAs have an electronically sensitive pad on which handwriting can be received and recognized. Apple's Newton™, which has been withdrawn from the market, was the first widely-sold PDA that accepted handwriting. Again, the PDA 150 is typically used for schedules, address book storage and retrieval and note-entering. Many applications, however, have been written for PDAs including network programs and Internet access programs. PDAs are increasingly combined with telephones and paging systems for wireless communications. Some PDAs offer a variation of the Microsoft Windows™ operating system called Windows CE™. Other PDA products use a proprietary operating system, such as PalmOS™ or third party operating systems.

An individually addressable vehicle ("IAV")160 is also located within the computer network 100. The IAV 160 can include any type of vehicle capable of having a computer with a wireless network receiver and/or transmitter that is individually addressable. For example, a car containing an Internet terminal is an IAV or a truck containing a computer with a wireless receiver/transmitter and sensors that sends back the status of the truck's operation and/or location fall within the class of IAVs.

In the illustrated embodiment, the IAV 160 can send requests to the server 110 within the computer network 100 to request information or perform specific functions, such as retrieving information related to the location of the vehicle or general Internet information. The IAV 160 may include a display (not shown) and an input device (not shown) such as push buttons, a touch screen or a combination of the two to facilitate user interface therewith.

A mobile telephone 170 may also be included in the computer network 100. The mobile telephone 170 includes a display capable of showing information retrievable from the computer network 100. The mobile telephone 170 can send and retrieve information from the server 110 and perform specialized tasks associated with the capabilities of a mobile telephone with network capabilities. In one embodiment, the mobile telephone 170 is capable of accessing Web pages, traversing the Internet and displaying information associated with Web pages on its display.

Those skilled in the pertinent art should know that the principles of the present invention are not limited for use with the types of devices described above. In other embodiments, the computer network 100 may include individually accessible electronic devices ("IAEDs"). IAEDs are electronic devices having a network interface that are individually addressable on a network. For example, appliances in a home or business connected to a network or the house itself having a unique network address and connected to the Internet are representative of IAEDs.

Figure 2:
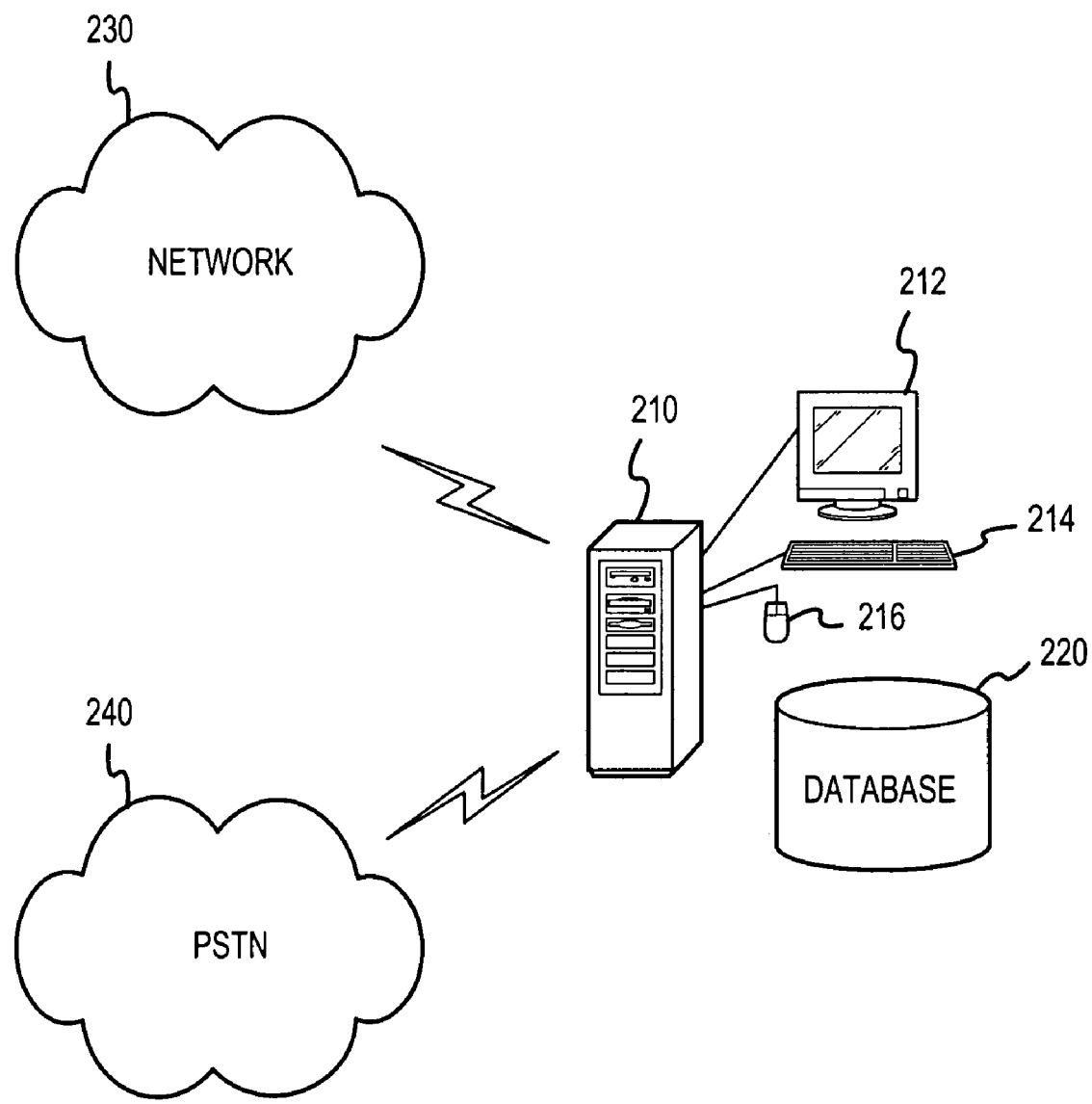
FIG. 2 illustrates a block diagram of an embodiment of a network server constructed in accordance with the principles of the present invention.

Turning now to FIG. 2, illustrated is a block diagram of an embodiment of a network server 210 constructed in accordance with the principles of the present invention. The server 210 is a server-based computer system that includes a monitor 212, a keyboard 214 and a pointing device 216. In the illustrated embodiment, the pointing device 216 is a conventional mouse. In another embodiment of the present invention, the pointing device 216 may be a touch screen (not shown) coupled to the monitor 212. In yet another embodiment, the server 210 may be a specialized computer system not requiring the monitor 212, the keyboard 214 and the pointing device 216.

The server 210 may further include tape, compact disc and holographic drives, telephony systems, devices (including videophone, paging and facsimile technologies), and serial and parallel ports. The server 210 may still further include network adapters, transceivers and modems (not shown) that allow the server 210 to connect to different types of networks.

The server 210 is couplable to a plurality of networks including, for instance, a first network 230 and a second network (e.g., a public switched telephone network, or "PSTN") 240. The first network 230 may be an LAN, a WAN, an intranet, an extranet, the Internet or a combination thereof. The PSTN 240 allows the server 210 to connect to other devices that require the use of or that are accessible through the PSTN 240. For example, the server 210 may access telephones, pagers, mobile phones, or dial-up services. The PSTN 240 also allows the server 210 to receive requests and process information received through the PSTN 240.

The server 210 is also coupled to a database 220. The database 220 may be embodied in a storage device, memory or a combination of the two. In one embodiment, the database 220 may include a flat file system, a relational database system or a combination of the two. The database 220 also includes different types of information required to fulfil the needs of the devices accessing the server. For example, the database 220 may include customer information relating to Internet transactions, information relating to devices that access and/or request information from the server 210 or specialized data relating to application programs running on the server 210.

Figure 3:
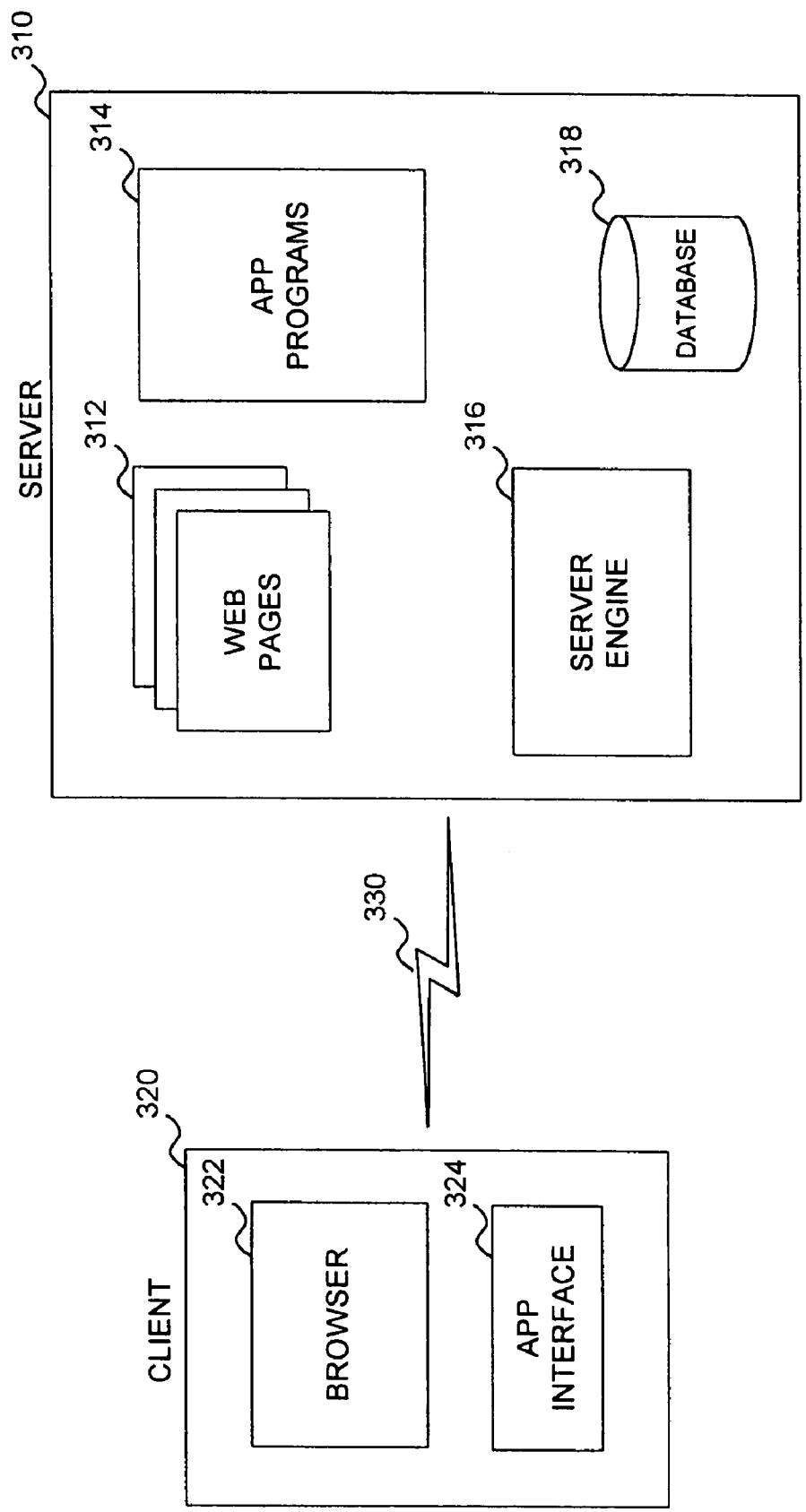
FIG. 3 illustrates a block diagram of an embodiment of a server system and a client system constructed in accordance with the principles of the present invention.

Turning now to FIG. 3, illustrated is a block diagram of an embodiment of a server system 310 and a client system 320 constructed in accordance with the principles of the present invention. In the illustrated embodiment, the server system 310 includes a set of Web pages 312, application programs 314, a server engine 316 and a database 318. The set of Web pages 312 are files that describe how to display and process graphical information, textual information and audio on the client system 320. In another embodiment of the present invention, the set of Web pages 312 may be X-Windows program files used to display and process information on X-Windows compatible systems.

Most Web pages are written in a language called Hypertext Markup Language ("HTML"). HTML is the set of "markup" symbols or codes inserted in a file intended for display on a World Wide Web browser. The markup tells the Web browser how to display a Web page's text and graphical images on the client's computer system. The individual markup codes are referred to as elements (also called "tags").

HTML is a standard recommended by the World Wide Web Consortium ("W3C") and adhered to by the major browsers, such as Netscape's Navigator™. Most browsers, however, also provide additional nonstandard codes. To account for the different browser types, the developers of the set of Web pages 312 design HTML pages for each type of browsers and download the appropriate code depending on the browser type. The more advanced features of HTML version 4 are called "dynamic HTML." The extensible form of HTML is called "XHTML." Those skilled in the pertinent are familiar with and the use of HTML, dynamic HTML and XHTML.

Another popular language used is the Extensible Markup Language ("XML"). XML is a flexible way to create common information formats and share both the format and the data on the World Wide Web, intranets, extranets and other types of networks. For example, computer makers might agree on a standard or common way to describe the information about a computer product (processor speed, memory size, and so forth) and then describe the product information format using XML. Such a standard way of describing data would enable a user to send an intelligent agent (e.g., a program) to each computer maker's Web site, gather data, and then make a valid comparison. XML can also be used by any individual or group of individuals or companies that wants to share information in a consistent way.

XML is similar to the HTML used on many of today's Web pages and both XML and HTML contain markup symbols to describe the contents of a page or file. HTML, however, describes the content of a Web page (mainly text and graphic images) only in terms of how it is to be displayed and interacted with. For example, a <P> starts a new paragraph. XML describes the content in terms of what data is being described. For example, a <PHONENUM> could indicate that the data that followed it was a phone number. This means that an XML file can be processed purely as data by a program or it can be stored with similar data on another computer or, like a HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language ("SGML"), the standard for how to create a document structure. Even though HTML and XML are different, both can be used together in Web applications.

Early applications of XML include a Channel Definition Format ("CDF"), which describes a channel, a portion of a Web site that has been downloaded to your hard disk and is then updated periodically as information changes. A specific CDF file contains data that specifies an initial Web page and how frequently it is updated. Another early application is ChartWare, which uses XML as a way to describe medical charts so that they can be shared by doctors. XML is also used in other areas, such as banking, e-commerce ordering, personal preference profiles, purchase orders, litigation documents and part lists.

The server system 310 also includes the application programs 314 including specialized programs that can control and monitor the actions of the server system 310 or perform specific functions that add substantial utility to the server system 310. The application programs 314 may be one or more separate programs or callable routines accessible by other programs within the server system 310 or by the client system 320. An example of application programs are applets and servlets.

An applet is a little application program. Before the World Wide Web, the built-in writing and drawing programs that came with Windows were sometimes called "applets." On the Web, using the object-oriented programming language Java, an applet is a small program that can be sent along with a Web page to a user. Java applets can perform interactive animations, immediate calculations, or other simple tasks without having to send a user request back to the server.

A servlet is a small program that runs on a server. The term was coined in the context of the Java applet, a small program that is sent as a separate file along with a Web page. Java applets, usually intended for running on a client, can result in such services as performing a calculation for a user or positioning an image based on user interaction.

Some programs, often those that access databases based on user input, preferably should be located and executed on the server system 310. Typically, these have been implemented using a Common Gateway Interface ("CGI") application. With a Java virtual machine running in the server system 310, however, such programs can be implemented with the Java programming language. The advantage of a Java servlet is that they can execute more quickly than CGI applications on the server system 310 under load conditions. Rather than causing a separate program process to be created, each user request is invoked as a thread in a single daemon process, meaning that the amount of system overhead for each request is slight. Those skilled in the pertinent art are familiar with and the use of applets, servlets, threads and daemon processes.

In the illustrated embodiment, the server system 310 also includes a server engine 316 and a database 318. The server engine 316 handles requests from the client system 320 via a communications link 330. The communications link 330 may be a direct connection line, a PSTN connection or a network connection. The server engine 316 can process requests for downloading the set of Web pages 312, retrieve and store information in the database 318, perform transaction processing and other miscellaneous functions performed by the server system 310. In one embodiment, the server engine 316 may be incorporated into the applications programs 314. In another embodiment, the server engine 316 may be, for instance, a reentrant program, multi-threaded program, multiple instances of the program or a combination thereof.

The database 318 may be a relational database system or a custom database system. The database 318 may be embodied in one or more separate hardware devices or embodied in hardware within the server system 310. The database 318 may include customer information, specialized application information, transactional information, status information or a combination thereof.

The client system 320 is conventionally a computer system that includes a browser 322 and an application interface 324. The browser 322 may be a conventional Internet browser or a specialized program used to display, access and process information. The browser 322 can request the set of Web pages 312 to be downloaded from the server system 310. Once one Web page is downloaded, the browser 322 will process the Web page and possibly display the information described in a Web page file associated with the Web pages 312. In one embodiment, the browser 322 uses HTML and XML languages in processing the Web pages. In another embodiment, the browser 322 can also process Java files and programs such as applets.

An application interface 324 is a program or set of programs that run on the client system 320 and interfaces with the server system 310 via the communication link 330. The application interface 324 can include network programs, GUIs, specialized application programs, communication programs, database programs or a combination thereof.

The previously described embodiments of the computer network, application programs and server and client systems are submitted for illustrative purposes only. Of course, other networks and systems are employable in connection with the principles of the present invention.

Figure 4:
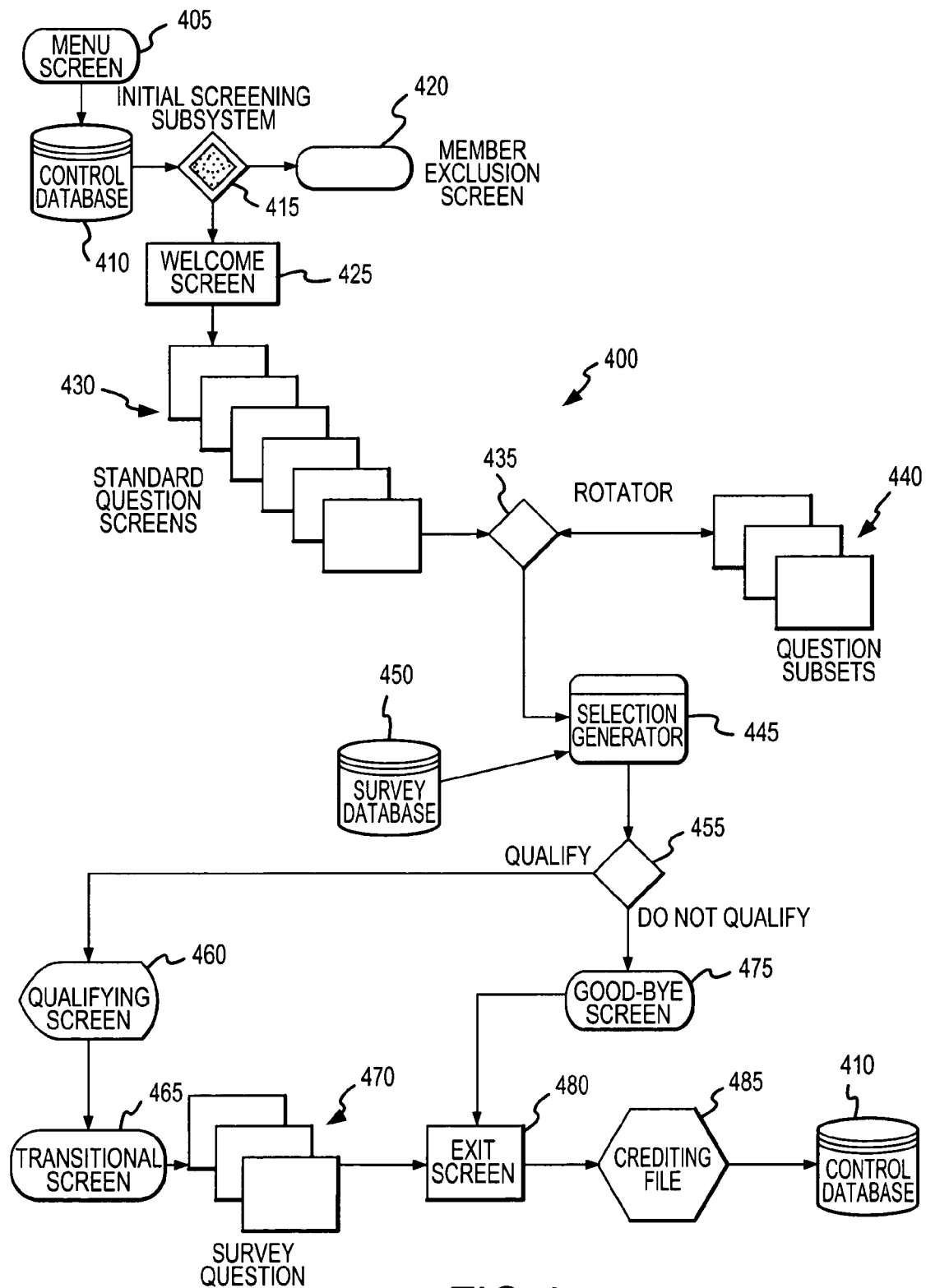
FIG. 4 illustrates a flow chart demonstrating the operation of a prior generation screening and survey selection system.

Turning now to FIG. 4, illustrated is a flow chart demonstrating the operation of a prior generation screening and survey selection system 400. A menu screen 405 provides an interface for a respondent to the screening and survey selection system 400. A control database 410 in conjunction with an initial screening subsystem 415 of the screening and survey selection system 400 provides an initial screening operation with respect to a respondent. The control database 410 includes information about the respondent which the initial screening subsystem 415 employs to serve its intended function. For instance, if the respondent has accessed the menu screen 405 within the last ten days, the control database 410 sets a flag which the initial screening subsystem 415 employs to deny the respondent access to the screening and survey selection system 400. In such instances, a member exclusion screen 420 then displays a message to the respondent that access to the screening and survey selection system 400 has been denied for the following reasons.

If the respondent has passed the initial screening analysis set by the initial screening subsystem 415, a welcome screen 425 generally describes the process that the respondent will follow in working with the screening and survey selection system 400. Thereafter, the respondent steps through a plurality of standard question screens 430 such that the screening and survey selection system 400 can obtain general information such as age, gender and zip code of residence of the respondent. Based on the answers provided above, a rotator 435 of the screening and survey selection system 400 selects one of a number of question subsets 440. The questions associated with a particular question subset 440 are more precisely tailored to a particular respondent depending on, for instance, the needs of the respondent or the interests of the respondent. The interaction between the rotator 435 and the question subsets 440 is thereafter iterative until a counter associated with the screening and survey selection system 400 is exhausted or no more of the question subsets 440 are available.

Based upon the answers associated with the question subsets 440, a selection generator 445 in conjunction with a survey database 450 of the screening and survey selection system 400 selects potential surveys for participation by the respondent. For example, if there are thirty surveys and the respondent more aptly qualifies for only ten of the surveys, then the selection generator 445 will choose one of the ten surveys for the respondent to participate in.

If a respondent qualifies for a survey (denoted by decisional block 455), the respondent is notified via a qualifying screen 460 of various information such as the length of the survey and any benefits associated with participating in the survey. The respondent then participates in the survey as denoted by a transitional screen 465 and the survey question screens 470. If a respondent does not qualify for a survey (see decisional block 455), the respondent may participate in a good-bye poll (via a good-bye screen 475). An exit screen 480 thereafter provides an exit transition for the respondent from the screening and survey selection system 400. Finally, the screening and survey selection system 400 credits the respondents file with any credits due for participating in the survey (via a crediting file 485) and updates the control database 410.

While the prior generation survey and selection system 400 provided a vast improvement over the brute force survey systems discussed above, there is room for improvement. It will become more apparent in the discussions that follow that the next generation survey and selection system substantially eliminates many of the inefficiencies associated with the prior generation survey and selection system 400 thereby making the experience more favorable for the respondents.

Figure 5:
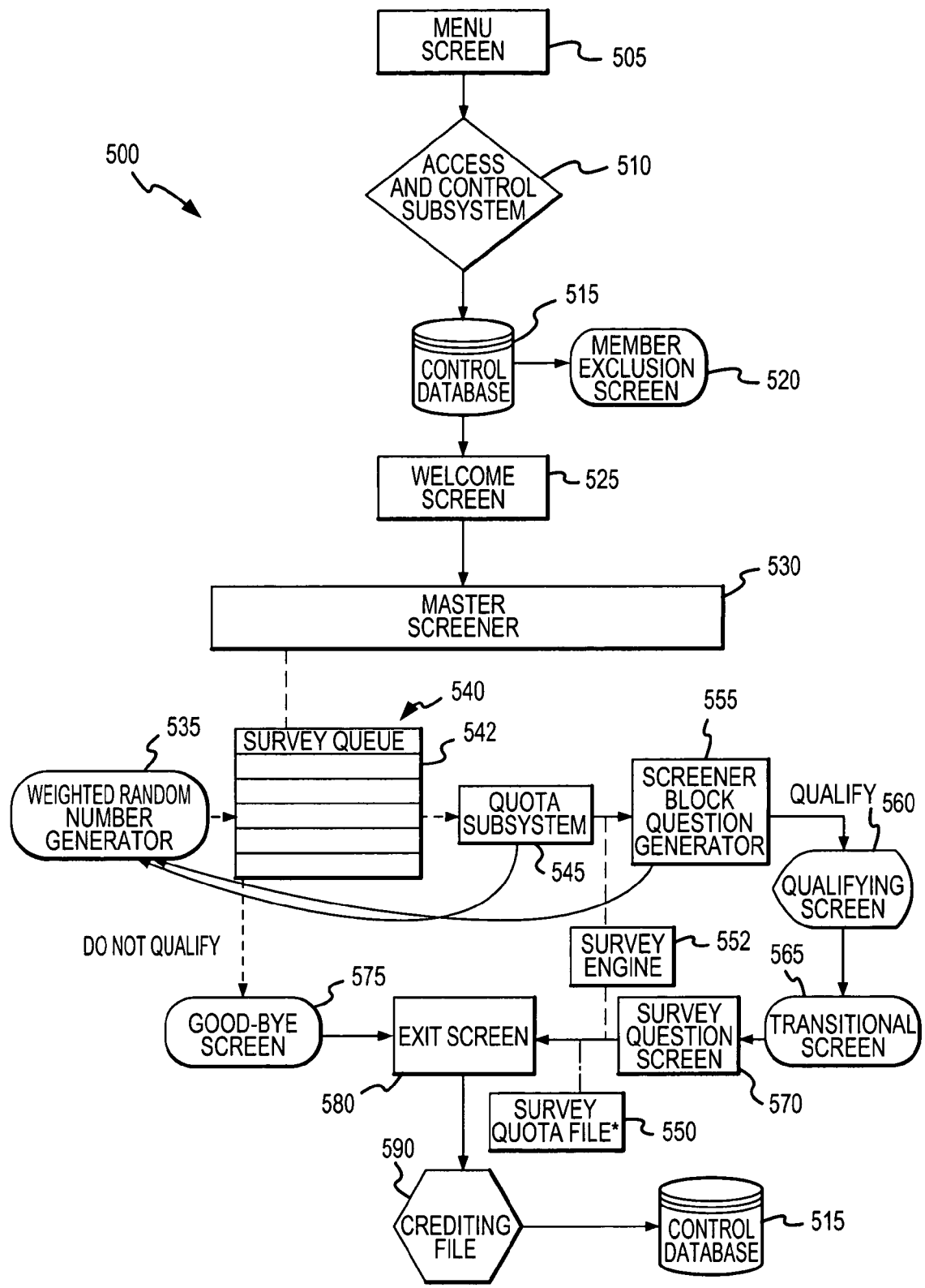
FIG. 5 illustrates a flow chart demonstrating the operation of a screening and survey selection system constructed according to the principles of the present invention.

Turning now to FIG. 5, illustrated is a flow chart demonstrating the operation of a screening and survey selection system 500 constructed according to the principles of the present invention. A menu screen 505 provides an interface for a respondent, either directly or via a hyperlink from another location, to the screening and survey selection system 500.

An access and control subsystem 510 queries a control database 515 to determine if a respondent may attain access to the screening and survey selection system 500. One of three situations generally occurs in determining the access rights. If the respondent is a new entrant, a "member not found" message is internally generated and the respondent gains access to the screening and survey selection system 500. With an entrant that has previously accessed the screening and survey selection system 500, one of two circumstances occur. When an area lockout date is greater than a lockout parameter (e.g., "X" number of days), then a "member found, no recent entry" message is internally generated and the respondent gains access to the screening and survey selection system 500. When the area lockout date is less than the lockout parameter, then a "member found, recent entry" message is internally generated and the respondent is denied access to the screening and survey selection system 500. In such instances, a member exclusion screen 520 displays a message to the respondent that access to the screening and survey selection system 500 has been denied for the following reasons. Generally speaking the lockout parameter is fourteen days with the flexibility to adjust the time period, as necessary. As a result, a respondent is prohibited from continually taking surveys at the expense of other members.

The control database 515 includes a table that stores information about the attributes associated with the respondent which the access and control subsystem 510 employs to serve its intended function, namely, determine the access rights associated with the respondent. The control database 515 may include information such as a screenname or login identification of the respondent. The control database 515 may also contain category codes from the past surveys completed by the respondent. The control database 515 may still further include the last entry date of the respondent and the completion dates that specific surveys were taken for each category code. Any information that assists the access and control subsystem 510 in providing an initial screening tool can be stored in the control database 515.

Assuming that the respondent gains access to the screening and survey selection system 500, a welcome screen 525 generally describes the process that the respondent will follow in working with the screening and survey selection system 500. Thereafter, a master screener 530 develops dynamic screener questions to ascertain characteristics associated with a respondent regardless of where the respondent entered the screening and survey selection system 500. For instance, if the respondent entered from an America Online location, then dynamic screener questions may include the zip code, age, gender, occupational information, household composition and decision making criteria associated with the respondent. If the respondent came from another location outside of the United States, the dynamic screener questions may include age, gender, country of residence and primary language information about the respondent. The master screener 530 attempts to ascertain as much information as possible to qualify the respondent for as many surveys as possible.

The screening and survey selection system 500 further includes a weighted random number generator 535 that selects a number between 1 and "Y" for a respondent. The number pertains to a position (e.g., a queue slot, one of which is designated 542) in a survey queue 540 that the respondent visits first in the screening and survey selection system 500. More specifically, the number "Y" denotes the amount of surveys that the respondent qualifies for based on the dynamic screener questions (ascertained by the master screener 530) and any category code exclusions (ascertained from the access and control subsystem 510 in conjunction with the control database 515). Preferably, the weighted random number generator 535 provides greater weight to certain numbers over others. As a result, if there is a survey that very few respondents can qualify for, then greater weight can be added to the specific position in the survey queue 540 thereby allowing such respondents that meet the criteria a greater chance of attaining access to screener block questions corresponding to that particular survey.

The survey queue 540 also serves as a storing house for all of the surveys that are presently available for a respondent. Again, the survey queue 540 communicates with the control database 515 to eliminate any surveys falling within a category code that the respondent previously participated in. Also, any surveys that the respondent does not qualify for based on the answers to the dynamic screener questions are eliminated from the survey queue 540. The weighted random number generator 535 then decides which one of the remaining available surveys that the respondent should participate. Each failed survey attempt eliminates that survey from the survey queue 540 until the respondent qualifies for a particular survey or it is determined that no surveys are best suited for the respondent.

A quota subsystem 545 of the screening and survey selection system 500 reads status information from a survey quota file 550 and determines if there is a need for a particular survey. The survey quota file 550 in conjunction with a survey engine 552 of the screening and survey selection system 500 controls the number of respondents that are presented certain questions (e.g., screener block questions). The survey engine 552 also tracks the number of respondents that complete particular surveys. The survey engine 552 still further monitors the flow of traffic in the screening and survey selection system 500 at specified time intervals and monitors the number of respondents that attain access to the screening and survey selection system 500.

If there is a need for a particular survey, then the respondent gains access to the screener block question generator (generally designated 555) and is asked screener block questions pertaining to that particular survey. If there is no need for that particular survey, then the respondent returns to the weighted random number generator 535 to begin the process over again. The quota subsystem 545, therefore, eliminates overages and reduces the time that a respondent participates in the screening and survey selection system 500.

While the screener block questions are random in nature, the screener block questions are specifically tailored to a particular survey and to a respondent that meets the criteria (in a manner as established above) associated with that particular survey. Assuming that the respondent qualifies for a survey based on the screener block questions, a qualifying screen 560 confirms that the respondent has qualified for the survey. The qualifying screen 560 also explains the length of the survey and any benefits associated with participating in the survey. For instance, the respondent may receive rewards points (or airline miles) that may be used for promotional efforts such as travel vouchers or online time on the Internet with America Online. At this point, the screening process is concluded and the respondent participates in the survey as denoted by a transitional screen 565 and the survey question screen 570. The survey may cover a couple of different topics or be directed to a specific subject. Also, each survey is unique and contains a varying number of questions.

If a respondent does not qualify for a survey (as determined by the interaction between the weighted random number generator 535, survey queue 540 and quota subsystem 545 as described above), the respondent may participate in a good-bye poll (via a good-bye screen 575). The good-bye poll may also provide the respondent suggestions of other avenues to earn benefits such as rewards points. An exit screen 580 thereafter provides an exit transition for the respondent from the screening and survey selection system 500. The exit screen 580 is customizable for each respondent based on the information attained during the screening and survey selection process.

Once the respondent has either completed the survey or good-bye poll, information is transferred to a crediting file 590. The crediting file 590 captures information such as the screenname or login identification of the respondent, category code and date of the survey, and benefit awarded the respondent. The information is then processed by the screening and survey selection system 500 and the control database 515 is updated. The access and control subsystem 510 and control database 515 are now prepared for the next visit by the respondent to the screening and survey selection system 500.

In the environment of the server/client system of FIG. 3, the screening and survey selection system 500 may be embodied in the application programs 314 and/or the database 318 employable in the server system 310. In other embodiments, the present invention may be embodied in other programs, firmware or combination of the two within a server system. In yet another embodiment, the present invention may be embodied in part in a client system as a browser or the application interface and part in a server system as introduced with respect to FIGS. 1 and 2.

With continuing reference to FIG. 3, the database 318 may include subsystems containing the control database 515, survey queue 540, survey quota file 550 and the crediting file 590. The database 318 and its respective subparts may be embodied in a relational database structure incorporating all of the information described above and other information as is necessary to facilitate the screening and survey selection system 500. One skilled in the pertinent art should know that the principles of the present invention are not limited for use with the types of database information described above. Of course, the database 318 may also be partitioned into separate database structures as the application dictates.

Additionally, the application programs 314 may include the access and control subsystem 510, the master screener 530, the weighted random number generator 535, the quota subsystem 545, the survey engine 552, and the survey screener block question generator 555. In conjunction therewith, the menu screen 505, welcome screen 525, qualifying and transitional screens 560, 565, survey question screens 570, good-bye screen 575, and exit screen 580 may be separate Web pages 312 as illustrated and described with respect to FIG. 3. Again, the server/client system of FIG. 3 is one of many environments and architectures that can accommodate the screening and survey selection system 500 and related method constructed according to the principles of the present invention.

Figure 6A:
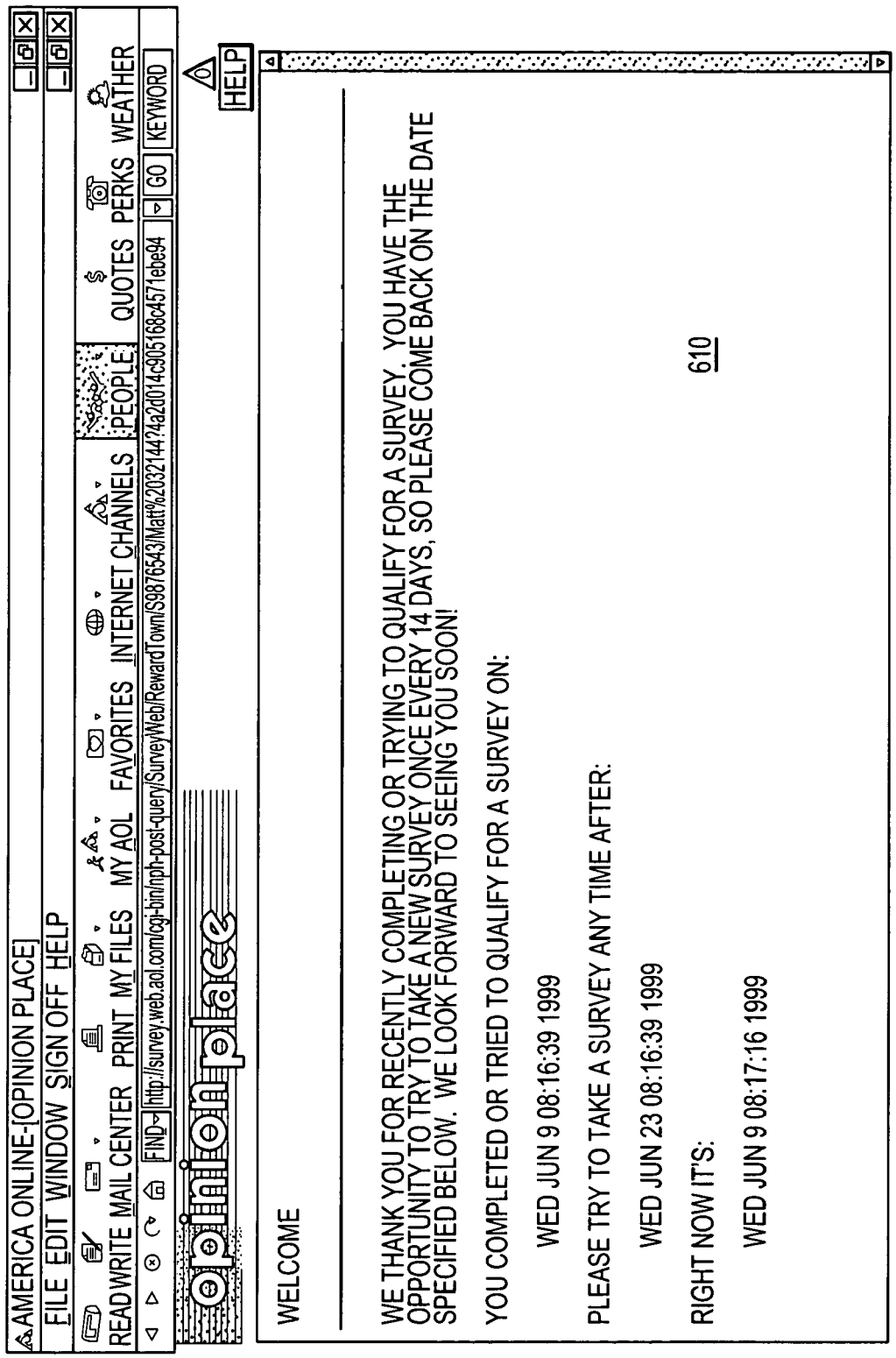
Figure 6B:
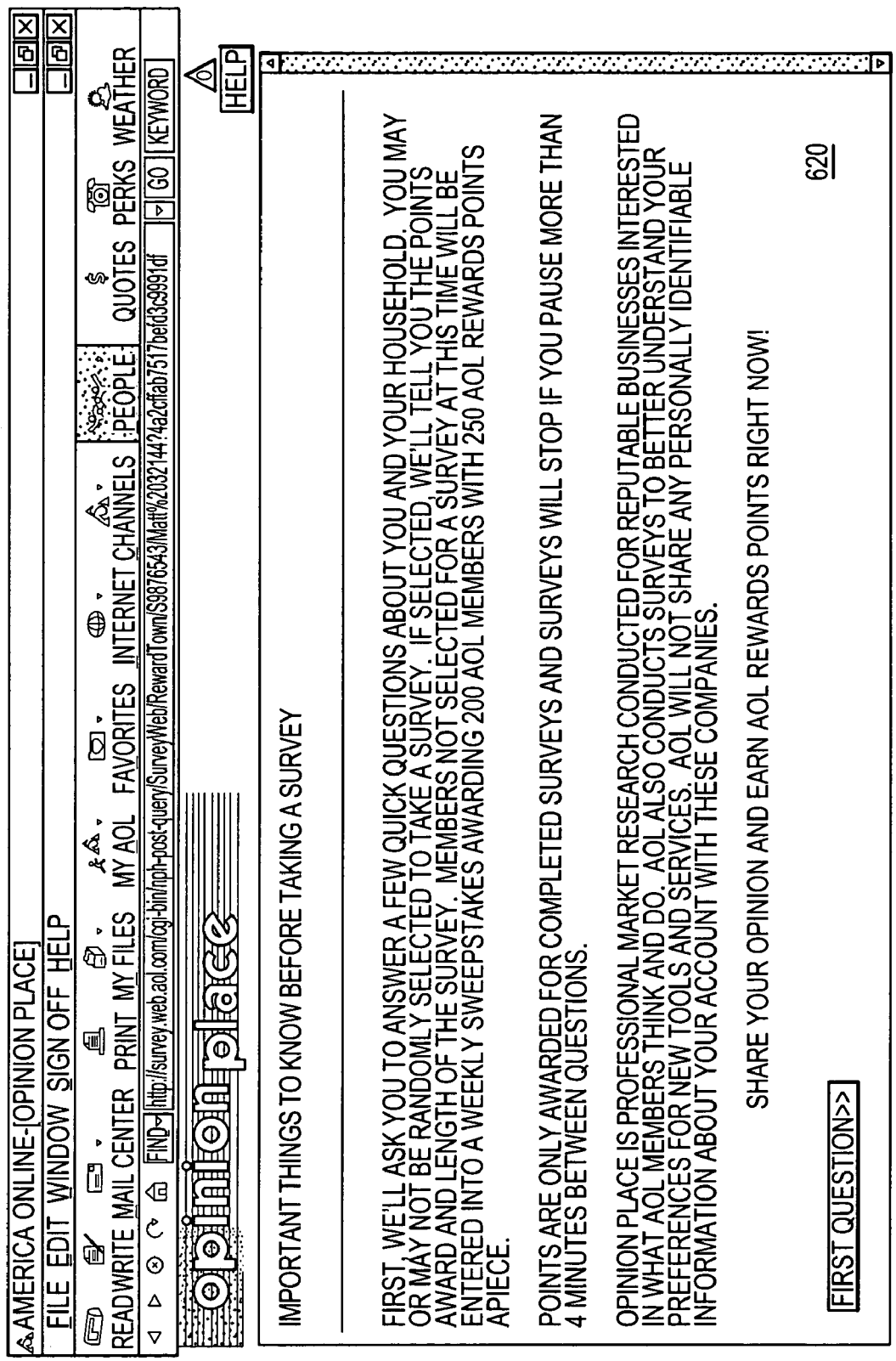

Turning now to FIGS. 6A–6G, illustrated are diagrams demonstrating selected screens associated with the screening and survey selection system 500 of FIG. 5. FIG. 6A illustrates a member exclusion screen 610 displaying a message to a respondent that access to the screening and survey selection system 500 has been denied and the reasons for the exclusion. FIG. 6B illustrates a welcome screen 620 displaying a message to a respondent explaining the process of working with the screening and survey selection system 500.

Figure 6E:
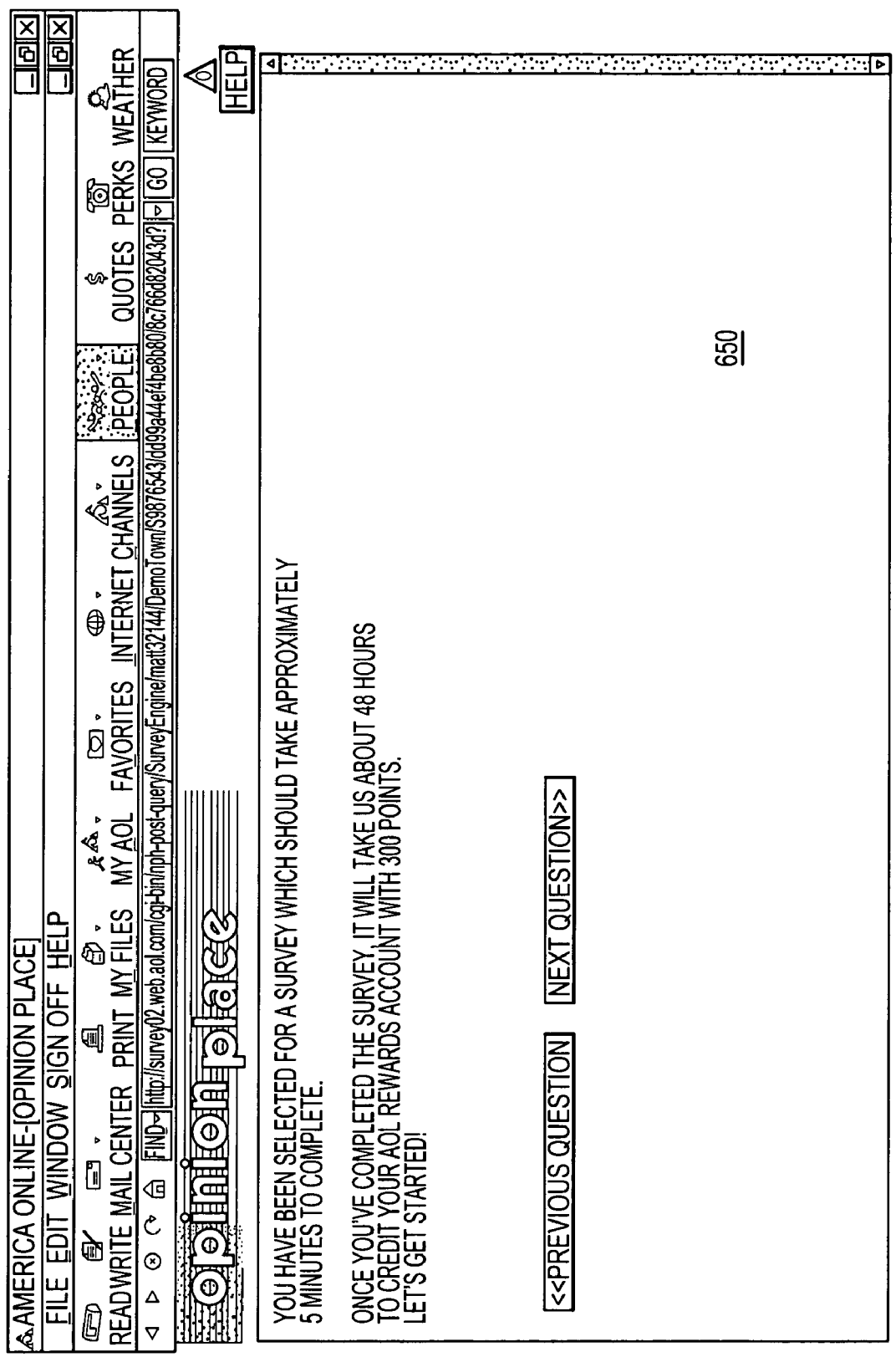
Figure 6F:
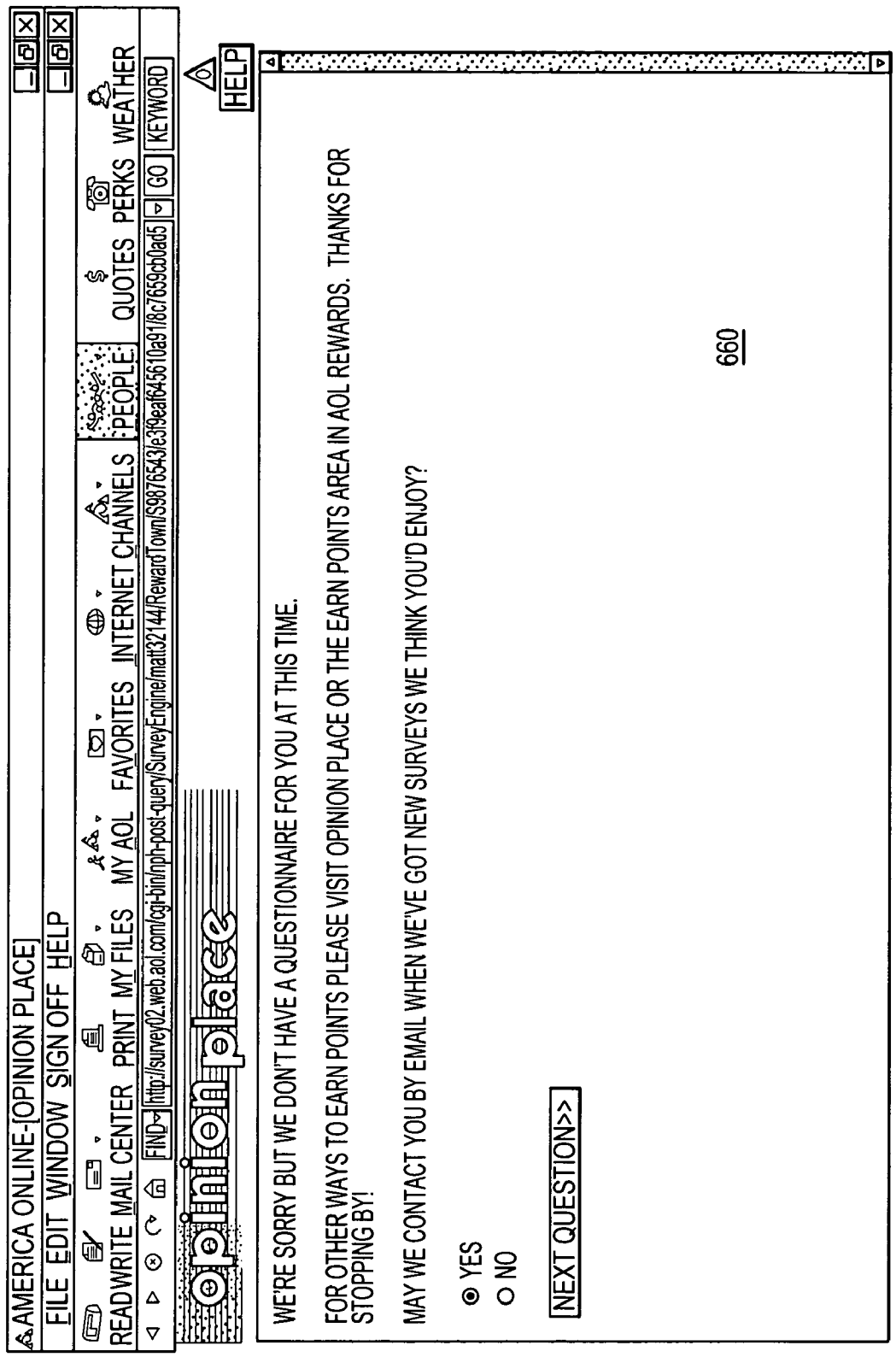
Figure 6G:
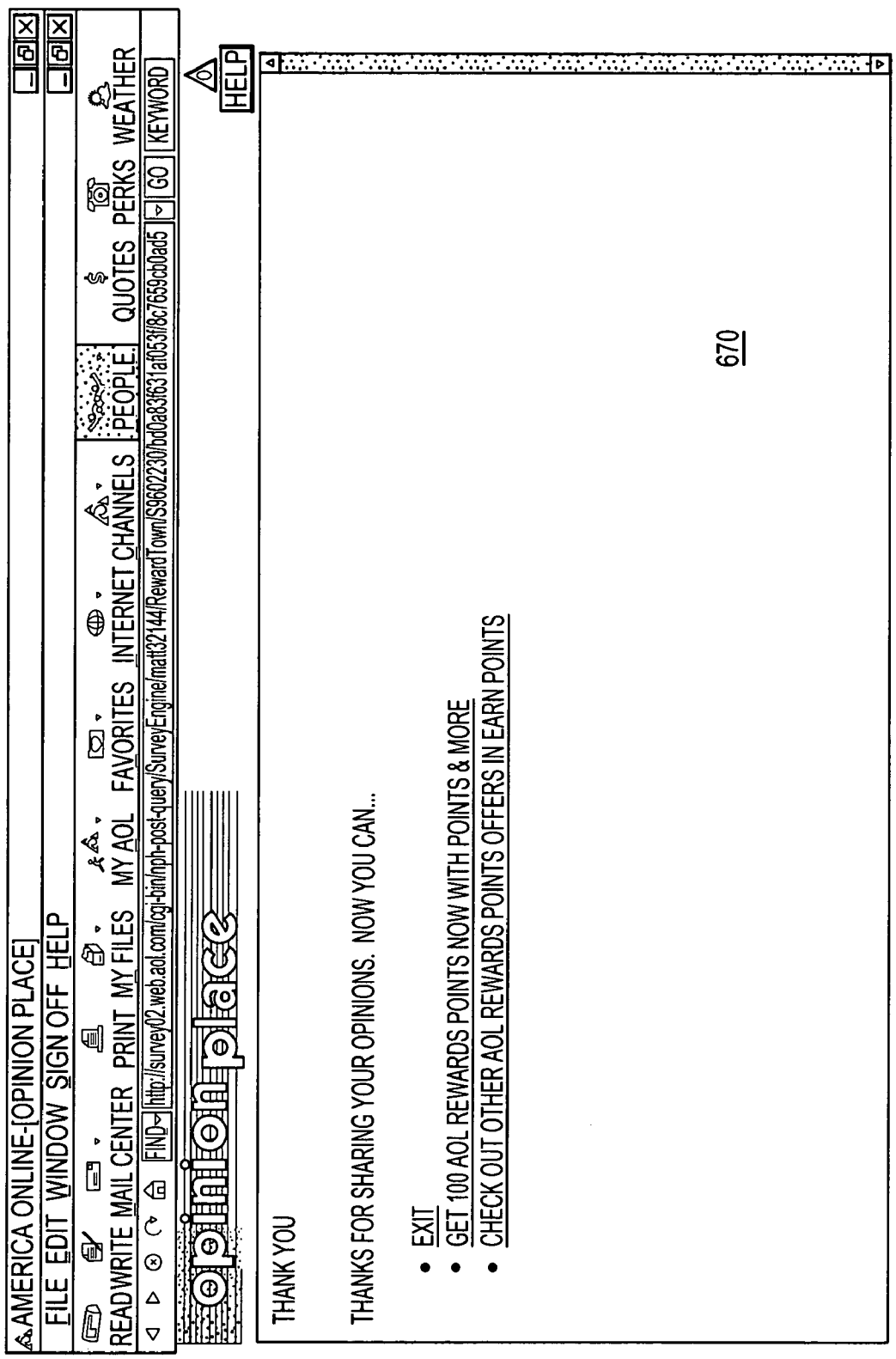

FIGS. 6C and 6D illustrate screener block question screens screen 630, 640, respectively, displaying exemplary screener block questions to a respondent. FIG. 6E illustrates a qualifying screen 650 displaying a message that a respondent has been selected for a survey and general information pertaining thereto. FIG. 6F illustrates a good-bye screen 660 displaying a message that a respondent has not qualified for a survey and that other options are available for the future. FIG. 6G illustrates an exit screen 670 displaying a message acknowledging a respondent's participation and providing benefit information associated with the screening and survey selection system 500 experience.

Although the present invention has been described in detail, those skilled in the art should understand that they can make various changes, substitutions and alterations herein without departing from the spirit and scope of the invention in its broadest form.

What is claimed is:

1. A screening and survey selection system, comprising:
    a master screener configured to identify a subset of surveys from among a set of surveys based on characteristics of a respondent;
    a survey queue having a plurality of queue slots, each of said plurality of queue slots including a survey from said identified subset of surveys;
    a weighted random number generator adapted to generate a number that corresponds to a selected one of said plurality of queue slots and that is dependent upon at least one characteristic associated with said respondent; and
    a screener block question generator adapted to:
        relate one or more screener block questions to said survey included in said selected queue slot, and
        enable presentation of said survey included in said selected queue slot to be conditioned upon a received response from said respondent to said one or more screener block questions.

2. The screening and survey selection system as recited in claim 1 further comprising an access and control subsystem adapted to determine access rights of said respondent.

3. The screening and survey selection system as recited in claim 1 further comprising a control database that contains attributes associated with said respondent.

4. The screening and survey selection system as recited in claim 3 wherein said attributes are selected from the group consisting of:
 a screenname of said respondent,
 a login identification of said respondent,
 category codes for past surveys and completion dates of said past surveys taken by said respondent, and
 a last entry date to said screening and survey selection system by said respondent.

5. The screening and survey selection system as recited in claim 1 wherein the master screener is adapted to develop questions that determine said characteristics.

6. The screening and survey selection system as recited in claim 1 wherein said characteristics are selected from the group consisting of:
 a zip code of residence of said respondent,
 an age of said respondent,
 a gender and ethnic background of said respondent,
 occupational information and composition of a household of said respondent, and
 decision making criteria of said household of said respondent.

7. The screening and survey selection system as recited in claim 1 further comprising a quota subsystem adapted to determine an availability of said survey corresponding to said selected one of said plurality of queue slots.

8. The screening and survey selection system as recited in claim 1 further comprising a survey quota file that contains status information regarding surveys located in said survey queue.

9. The screening and survey selection system as recited in claim 1 further comprising a survey engine adapted to monitor a number of respondents accessing said screening and survey selection system.

10. The screening and survey selection system as recited in claim 1 further comprising a crediting file that contains benefit information associated with said respondent.

11. The system as recited in claim 1 wherein the weighted random number generator is configured to associate weights of varying level with each of a first queue slot and a second queue slot, wherein the weighted random number generator is configured to realize a level of difficulty in qualifying for a first survey included in the first queue slot and a level of difficulty in qualifying for a second survey included in the second queue slot and distinguish a level of a weight to be assigned to the first and the second queue slots based on the realized levels of difficulty associated therewith.

12. The system as recited in claim 11 wherein the weighted random number generator is configured to assign a level of weight to the first queue slot that is greater than the level of weight assigned to the second queue slot when the level of difficulty in qualifying for the first survey is greater than the level of difficulty in qualifying for the second survey.

13. The system as recited in claim 1 wherein the screener block question generator is adapted to develop a plurality of screener block questions after the weighted random number generator generates the number.

14. The system as recited in claim 1 wherein the screener block question generator is adapted to develop a plurality of screener block questions that correspond to a subset of all screener block questions associated with the subset of surveys included in the plurality of queue slots.

15. The system of claim 1, wherein all weights used by the weighted random number generator are non-zero.

16. A computer system for effecting a screening and survey selection system over a computer network, comprising:
 a database coupled to said computer network and including a survey queue; and
 a server associated with said database, including:
  a master screener that identifies a subset of surveys from among a set of surveys available for a respondent based on criteria related to said respondent;
  a weighted random number generator that:
   associates each survey in said subset with a survey queue slot in said survey queue, and
   generates a number that corresponds to a selected one of said survey queue slots as a function of at least one characteristic associated with said respondent; and
  a screener block question generator that:
   relates one or more screener block questions to said survey associated with said selected one of said survey queue slots, and
   enables presentation of said survey associated with said selected one of said survey queue slots to be conditioned upon a received response from said respondent to said one or more screener block questions.

17. The computer system as recited in claim 16 wherein said server further comprises an access and control subsystem that determines access rights of said respondent.

18. The computer system as recited in claim 16 wherein said database further comprises a control database subsystem that contains attributes associated with said respondent.

19. The computer system as recited in claim 18 wherein said attributes are selected from the group consisting of:
 a screenname of said respondent,
 a login identification of said respondent,
 category codes for past surveys and completion dates of said past surveys taken by said respondent, and
 a last entry date to said screening and survey selection system by said respondent.

20. The computer system as recited in claim 16 wherein said master screener is configured to develop questions that determine said criteria.

21. The computer system as recited in claim 16 wherein said criteria comprise characteristics of the respondent and are selected from the group consisting of:
 a zip code of residence of said respondent,
 an age of said respondent,
 a gender and ethnic background of said respondent,
 occupational information and composition of a household of said respondent, and
 decision making criteria of said household of said respondent.

22. The computer system as recited in claim 16 wherein said server further comprises a quota subsystem that determines an availability of said survey corresponding to said selected one of said plurality of queue slots.

23. The computer system as recited in claim 16 wherein said database further comprising a survey quota file that contains status information regarding surveys located in said survey queue.

24. The computer system as recited in claim 16 wherein said server further comprises a survey engine that monitors a number of respondents accessing said computer system.

25. The computer system as recited in claim 16 wherein said database further comprises a crediting file that contains benefit information associated with said respondent.

26. The computer system as recited in claim 16 wherein the weighted random number generator is configured to associate weights of varying level with each of a first queue slot and a second queue slot, wherein the weighted random number generator is configured to realize a level of difficulty in qualifying for a first survey included in the first queue slot and a level of difficulty in qualifying for a second survey included in the second queue slot and distinguish a level of a weight to be assigned to the first and the second queue slots based on the realized levels of difficulty associated therewith.

27. The computer system as recited in claim 26 wherein the weighted random number generator is configured to assign a level of weight to the first queue slot that is greater than the level of weight assigned to the second queue slot when the level of difficulty in qualifying for the first survey is greater than the level of difficulty in qualifying for the second survey.

28. The computer system as recited in claim 16 wherein the screener block question generator is adapted to develop a plurality of screener block questions after the weighted random number generator generates the number.

29. The computer system as recited in claim 16 wherein the screener block question generator is adapted to develop a plurality of screener block questions that correspond to a subset of all screener block questions associated with the surveys included in the plurality of queue slots.

30. The computer system of claim 16, wherein all weights used by the weighted random number generator are non-zero.

31. A screening and survey selection system, comprising:
a master screener configured to filter a subset of surveys from among a set of surveys based on criteria related to a respondent;
a survey queue having a plurality of queue slots, each of said queue slots including a survey from said subset of surveys; and
a weighted random generator adapted to select one of said surveys in said subset of surveys at random by generating a number that corresponds to selected one of said plurality of queue slots and that is dependent upon at least one characteristic associated with said respondent.

32. The system of claim 31, wherein the weighted random number generator is configured to associate weights of varying level with each of a first survey and a second survey, wherein the weighted random number generator is configured to realize a level of difficulty in qualifying for the first survey and a level of difficulty in qualifying for the second survey and distinguish a level of a weight to be assigned to the first and the second surveys based on the realized levels of difficulty associated therewith.

33. The system of claim 32, wherein the weighted random number generator is configured to assign a level of weight to the first survey that is greater than the level of weight assigned to the second survey when the level of difficulty in qualifying for the first survey is greater than the level of difficulty in qualifying for the second survey.

34. The system of claim 31, wherein all weights used by the weighted random number generator are non-zero.

35. A computer system for effecting a screening and survey selection system over a computer network, comprising:
a database coupled to the computer network and including a survey queue having a plurality of slots each of said queue slots including a survey; and
a sever associated with the database, including:
a master screener configured to identify a subset of surveys from among a set of surveys based on criteria related to the respondent; and
a weighted random number generator configured to select one of said surveys in said subset of surveys at random by generating a number that corresponds to selected one of said plurality of queue slots and that is dependent upon at least one characteristic associated with said respondent.

36. The system of claim 35 wherein the weighted random number generator is configured to associate weights of varying level with each of a first survey and a second survey, wherein the weighted random number generator is configured to realize a level of difficulty in qualifying for the first survey and a level of difficulty in qualifying for the second survey and distinguish a level of a weight to be assigned to the first and the second surveys based on the realized levels of difficulty associated therewith.

37. The system of claim 36 wherein the weighted random number generator is configured to assign a level of weight to the first survey that is greater than the level of weight assigned to the second survey when the level of difficulty in qualifying for the first survey is greater than the level of difficulty in qualifying for the second survey.

38. The system of claim 35, wherein all weights used by the weighted random number generator are non-zero.

* * * * *